United States Patent Office 2,979,543
Patented Apr. 11, 1961

2,979,543

PROCESS FOR THE PRODUCTION OF CYCLODO-DECATRI-(1,5,9)-ENES CONCURRENTLY WITH OTHER CYCLIC HYDROCARBONS

Günther Wilke, Mulheim (Ruhr), and Herbert Müller, Ludwigshafen (Rhine), Germany, assignors to Studiengesellschaft Kohle m.b.H., Mulheim (Ruhr), Germany, a corporation No Drawing. Filed Jan. 22, 1958, Ser. No. 710,426

Claims priority, application Germany Jan. 31, 1957

12 Claims. (Cl. 260—666)

This invention relates to a process for the production of cyclododecatri-(1,5,9)-enes concurrently with other cyclic organic hydrocarbons having at least eight carbon atoms and at least two double bonds in the ring, for example cyclooctadiene and cyclohexadecatetra-(1,5,9,13)-ene.

In copending application Serial No. 641,252 filed February 20, 1957 in the name of Günther Wilke, a process is disclosed wherein a diolefine, preferably isoprene, piperylene or advantageously butadiene, is subjected to the action of a catalyst comprising a titanium halide and an alkyl aluminum halide at a temperature between —20 and 150° C., preferably in the presence of a solvent. With such a process, yields of more than 80% are obtained of compounds having a triple-unsaturated 12-ring. Examination of the infra-red spectrum of the compounds obtained by this process has shown that the compounds with a 12-ring which are formed are substantially compounds in which two double bonds in the ring are associated with the transconfiguration, while the third double bond is associated with the cis-configuration.

It has now been found that cyclododecatri-(1,5,9)-enes of the general formula $C_{12}X_{18}$, in which each X is a hydrogen atom or a hydrocarbon radical, can be produced concurrently with other cyclic hydrocarbons by reaction of butadi-(1,3)-ene or one of its two monomethyl substitution products in the presence of a catalyst consisting of one or more chromium halides and one or more aluminium hydrocarbon compounds. Isoprene, piperylene and butadiene are therefore suitable starting materials. Instead of starting from the substances as such, it is possible to use as starting material gas mixtures containing these substances. Particularly suitable are those dehydrogenation products of butane or butene which are easy to produce technically.

The catalysts can for example contain aliphatic or aromatic aluminium hydrocarbons, preferably aluminium trialkyls or aluminium alkyl hydrides, and if desired also aluminium dialkyl monohalides, together with a chromium halide or hydroxyhalide or a mixture of halides of chromium. One type of catalyst which is particularly suitable is obtained from chromic chloride and one or more aluminium trialkyls or aluminium dialkyl hydrides. The aluminium compounds reduce the heavy metal salt extremely easily. When catalyst consisting of chromyl chloride and aluminium triethyl are used, preferably when the molar ratio between Cr and Al is 1:4 to 1:5, the reaction product consists essentially of the trans-trans-trans-12-cyclic compound.

The starting substances can be reacted directly in the catalyst mixture, or it is possible to work in the presence of solvents, preferably in the presence of aliphatic or aromatic hydrocarbons or halogenated hydrocarbons, for example benzene, toluene, chlorobenzene, dichlorobenzene or hexane. The solvent used should not attack the catalyst.

The reaction takes place even at room temperature with good yields of more than 50%, though it may be assisted by raising the temperature to 150° C. It is also possible to work at temperatures below 0° C., for example down to —20° C. It is usual to operate at normal pressure, but subatmospheric pressures or even elevated pressures can be used. The process can take place continuously without any further difficulties.

The isomeric reaction products which are frequently formed can be separated by known methods, such as fractional distillation or crystallisation.

The cyclic compounds obtained are valuable starting materials for organic syntheses. The cyclic organic compounds can be hydrogenated in known manner, for example cyclododecatri-(1,5,9)-ene can be hydrogenated to cyclododecene or cyclododecane. These hydrogenated products can in their turn be oxidised in known manner to the corresponding dicarboxylic acids, for example dodecane-(1,12)-diacid.

Alternatively, the cyclododecatriene can be directly oxidised to form succinic acid.

The dicarboxylic acids obtained are, as is known, valuable starting materials for the production of plastics, for example polyamides and polyesters.

The following examples further illustrate the invention.

Example 1

4 cc. of aluminum triethyl are dissolved in a nitrogen atmosphere in 100 cc. of absolute benzene. After the addition of 1 g. of finely powdered anhydrous chromic chloride, the mixture is stirred for 15 hours at room temperature. The solution becomes dark in color due to the extremely finely divided catalyst. Some of the chromic chloride is not reacted under these conditions. The mixture is saturated with pure butadiene and stirred for 48 hours at room temperature. The catalyst is then decomposed with a small quantity of methanol and the solution washed with dilute sulphuric acid and water. The solution is dried with calcium chloride. No polymer can be precipitated from the solution with acetone. After removal of the solvent, the residue is distilled in vacuo. 5 g. of trans-trans-trans-cyclododecatri-(1,5,9)-ene are obtained (B.P.$_{13}$=95° C.), this substance beginning to crystallise as fine long needles during the vacuum distillation in a Claisen flask. Melting point: 34° C.; the yield is 50%. Infra-red analysis clearly shows that it is the trans-trans-trans-compound which is concerned, since it is no longer possible to detect in the spectrum those absorption bands which are characteristic of the cis-double bonds in the mid-position.

By hydrogenation of the crystalline product, cyclododecane is obtained in a satisfactory manner.

Example 2

0.5 cc. of chromyl chloride is dissolved in 100 cc. of absolute benzene and 3.1 cc. of diethyl aluminium hydride (molar ratio Cr:Al=1:4.7) are added under argon. The mixture becomes slightly heated and it is stirred for 15 minutes, a dark brown catalyst suspension being formed. Pure butadiene is introduced while stirring vigorously and the temperature rises to 40° C. By introduction of more gas, the solution is kept saturated with butadiene. The temperature falls to 30° C. over a period of 2 hours. The flow of butadiene is shut off and stirring is continued for another 15–16 hours at room temperature. After this time, the solution does not contain unreacted butadiene, of which 24 g. have been taken up. The mixture is then worked up as described in Example 1. By distillation, 17 g. of trans-trans-trans-cyclododecatri-(1,5,9)-ene are obtained, this substance crystallizing immediately. The yield is 71%. After recrystallization from ethanol, the melting point is 34° C.

Example 3

0.48 cc. (=6 m.mol) of chromyl chloride are dissolved in 100 cc. of absolute benzene in a nitrogen atmosphere. 3.3 cc. (=24 m.mol) of aluminium triethyl are slowly added dropwise to this solution, whereupon the mixture becomes heated. Pure butadiene is then introduced and the temperature slowly rises. The temperature is kept at 50° C. by careful cooling with compressed air. Using this procedure, 60–65 g. of butadiene are taken up over a period of 3 hours. The flow of butadiene is then shut off, and the mixture is vigorously stirred for another 2 hours so that the dissolved butadiene is completely reacted. The catalyst is decomposed with a little methanol and the solution is washed with dilute sulphuric acid and water. About 1 g. of butadiene polymer can be precipitated with acetone from the solution dried with calcium chloride. The solution is worked up by distillation; 53 g. of cyclododecatri-(1,5,9)-ene are obtained, this consisting of about 65% of the trans-trans-trans-compound as well as the trans-trans-cis-compound. The distillation residue is 10 g. Yield of $C_{12}$=83% of the theoretical.

*Example 4*

The procedure of Example 2 is used, but absolute toluene is used as solvent. The reaction proceeds in a similar manner and the yield of $C_{12}$ is 71% of the theoretical.

*Example 5*

The procedure is as in Example 2, but absolute chlorobenzene is used as solvent. The reaction takes place in the same way and the yield of $C_{12}$ is 71% of the theoretical.

*Example 6*

The procedure is as in Example 3, but hexane is used as solvent; the cyclododecatri-(1,5,9)-ene is obtained in a yield of 60%.

*Example 7*

4.8 cc. of chromyl chloride are dissolved in 1 litre of absolute benzene and 33 cc. of aluminium triethyl are added under argon. The mixture becomes slightly heated, and it is stirred for 15 minutes, whereby a dark brown catalyst suspension is formed. 400 g. of isoprene are added dropwise at 50° C. over a period of 3 hours, no rise in temperature taking place. The reaction mixture is maintained at 40° C. for another 18 hours with vigorous stirring. The mixture is then worked up in the manner described in Example 1. The dried solution is distilled. As well as unmodified isoprene and benzene, there are obtained 160 g. of a fraction boiling at 50–130° C. at 8 mm. pressure, and 110 g. of a residue consisting of tetrameric substances and substances of higher molecular weight. The fraction boiling at a temperature up to 130° C. is subjected to a fine fractionation process, which provides 90 g. of a substance distilling over at B.P.$_{12}$=135° C., $n_D^{20}$=1.5125, this substance corresponding to a trimethyl cyclododecatriene, as confirmed by the infra-red spectrum and catalytic hydrogenation. The methyl groups are on the double-bond carbon atoms.

*Example 8*

The procedure is as set out in Example 7 and the catalyst is produced from 0.5 cc. of chromyl chloride and 3.3 cc. of aluminium triethyl in 100 cc. of absolute benzene. 45 g. of piperylene are vigorously stirred for 24 hours at 50° C. with this catalyst suspension. By similar working up and subsequent fine fractionation, a trimethyl cyclododecatriene is obtained with a B.P.$_{2.5mm.}$=92–94° C., $n_D^{20}$=1.4910–1.4930, which can be confirmed by catalytic hydrogenation and infra-red analysis. The methyl groups are situated on the carbon atoms adjacent to the double bonds.

What we claim is:

1. Process for the production of cyclododecatri-(1,5, 9)-enes which comprises contacting a member selected from the group consisting of butadiene, isoprene, and piperylene with a catalyst comprising a chromium halide and an organo-aluminum compound selected from the group consisting of aluminum trialkyls, aluminum alkyl hydrides and aluminum dialkyl monohalides to thereby produce cyclododecatri-(1,5,9)-ene with other cyclohydrocarbons having at least 8 carbon atoms and at least two double bonds in the ring.

2. Process, according to claim 1, in which said chromium halide is in the form of a mixture of different chromium halides.

3. Process, according to claim 1, in which the catalyst is a chromium hydroxy halide.

4. Process, according to claim 1, in which the catalyst essentially consists of chromyl chloride and aluminum triethyl, and in which said cyclododecatri-(1,5,9)-ene predominately consists of trans-trans-trans-cyclododecatri-(1,5,9)-ene.

5. Process, according to claim 4, in which the catalyst contains said chromyl chloride and aluminum triethyl in a molar ratio of chromium to aluminum of about 1:5.

6. Process, according to claim 1, in which said contacting is effected in the presence of an inert solvent.

7. Process, according to claim 6, in which said solvent is a member selected from the group consisting of aliphatic, aromatic, and halogenated hydrocarbons.

8. Process, according to claim 7, in which said solvent is benzene.

9. Process, according to claim 1, in which said contacting is effected at a temperature between about −20 to +150° C.

10. Process, according to claim 9, in which said contacting is effected at a temperature of about 40° C.

11. Process, according to claim 1, which includes separating the isomeric reaction products formed by fractional distillation.

12. Process, according to claim 1, which includes separating the isomeric reaction products formed by crystallization.

References Cited in the file of this patent

UNITED STATES PATENTS

| | | |
|---|---|---|
| 2,674,634 | Greensfelder et al. | Apr. 6, 1954 |
| 2,686,208 | Reed | Aug. 10, 1954 |
| 2,686,209 | Reed | Aug. 10, 1954 |
| 2,868,771 | Ray et al. | Jan. 13, 1959 |
| 2,886,561 | Reynolds et al. | May 12, 1959 |

FOREIGN PATENTS

| | | |
|---|---|---|
| 533,362 | Belgium | May 16, 1955 |
| 538,782 | Belgium | Dec. 6, 1955 |

OTHER REFERENCES

Rodd: "Chemistry of Carbon Compounds," volume II, part A, pages 258 and 267 relied on, Elsevier Publishing Corp., New York.